Aug. 9, 1960 M. L. SMITH 2,948,891

TELEVISION RECEIVERS

Filed June 20, 1957 5 Sheets-Sheet 1

INVENTOR
MERTON L. SMITH
BY Louis L. Gagnon
ATTORNEY

TELEVISION RECEIVERS

Filed June 20, 1957 5 Sheets-Sheet 2

INVENTOR
MERTON L. SMITH
BY Louis L. Gagnon
ATTORNEY

INVENTOR
MERTON L. SMITH
BY Louis L. Gagnon
ATTORNEY

Aug. 9, 1960 M. L. SMITH 2,948,891

TELEVISION RECEIVERS

Filed June 20, 1957 5 Sheets-Sheet 4

INVENTOR
MERTON L. SMITH
BY Louis L. Gagnon
ATTORNEY

INVENTOR
MERTON L. SMITH
BY Louis L. Gagnon
ATTORNEY

United States Patent Office 2,948,891

Patented Aug. 9, 1960

2,948,891

TELEVISION RECEIVERS

Merton L. Smith, Woodstock, Conn., assignor to American Optical Company, Southbridge, Mass., a voluntary association of Massachusetts Filed June 20, 1957, Ser. No. 666,923

6 Claims. (Cl. 178—7.85)

This invention relates to television receivers and has particular reference to improve means and methods for forming a composite television image from a plurality of superposed image components.

In projection television receivers of the type embodying a plurality of kinescopes each of which are adapted to reproduce a particular image component of a composite picture image to be formed by superpositioning the image components of the kinescopes upon a remote viewing screen, considerable difficulty has been encountered heretofore in readily obtaining an accurate registry of said image components at the viewing screen. In the forming of a composite color television image precise registry of the superposed monochromatic image components of the individual kinescopes is extremely important since any lack of registry of the picture components creates a color fringing or undesirable mixing of the colors in the composite picture image which destroys the definition and color balance thereof.

Various means have been devised in attempts to improve the accuracy of registration of the projected image components in devices of the above character and it has been found that in each case, there is a particular need for an improved simple and inexpensive means for precisely aligning and mounting the kinescopes of the apparatus relative to the viewing screen and/or optical projection equipment used to superpose the individual picture components of the composite image to be viewed.

While the optical means for projecting the picture image components from the individual kinescopes to the viewing screens may be quite readily standardized and accurately aligned relative to a viewing screen in projection devices of the above character, variations in the electrical and physical characteristics of individual kinescopes require that each of said kinescopes be individually aligned relative to the projection equipment used therewith. As in the case of all electron tubes, variations in the operating characteristics of different kinescopes, which are more commonly known as television picture tubes, are unavoidable.

In conventional color projection type television receivers of the three picture tube or trinoscope type, various cumbersome and complicated mounting devices have been used to support the picture tubes in aligned relation with the projection apparatus of the receivers and since the alignment of each individual picture tube in the receiver requires several adjustments such as for focusing, centering and aligning the horizontal and vertical axes of the picture images or rasters, it has been necessary heretofore to provide intricate and costly picture tube supports on the television receiver itself which require the picture tube adjustments to be made after the tube has been installed in the receiver. Replacement of picture tubes then requires tedious and time consuming aligning procedures which make home servicing of such receivers difficult and costly.

Accordingly, it is a principal object of the present invention to provide new and improved means and method for producing a composite television image from a plurality of superposed image components wherein the focus and precise registry of said image components is automatically obtained.

Another object is to provide novel mounting means for supporting a plurality of picture tubes in projection type television receivers.

Another object is to provide a readily replaceable picture tube units for use with projection type television receivers which picture tube units are pre-aligned, prefocused and provided with reference mounting means adapted to be attached in mating relation with other reference mounting means on the projection apparatus of said receivers.

Another object is to provide separate means for aligning and pre-focusing television picture tubes for subsequent use in color television projection units of the above character.

A further object is to provide simple, secure and economical means for applying reference mounting plates to prefocused and pre-aligned television picture tubes for subsequent use in mounting said tubes in their proper related positions of use in television projection units.

A still further object is to provide novel means and method for overcoming the intricate, time consuming and costly servicing procedures common to present day projection type television receivers by providing readily interchangeable picture tube units for such receivers which are pre-aligned and pre-focused in accordance with the requirements of the projection apparatus of the receivers to be used therewith.

Other objects and advantages of the invention will become apparent from the following description when taken in conjunction with the accompanying drawings in which.

Figure 4:
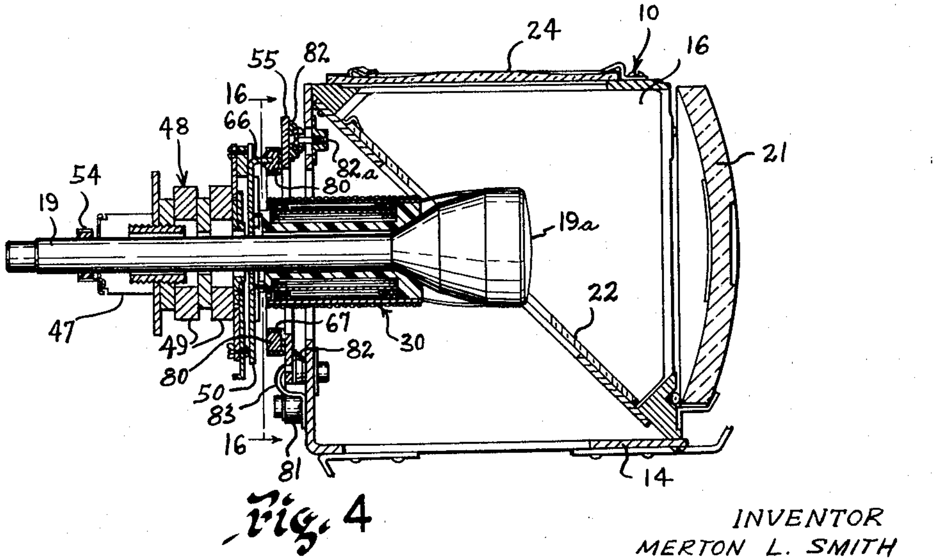
Fig. 4 is a cross-sectional view taken substantially on line 4—4 of Fig. 3.
Figures 5, 7, 8, 9, 10, 16:
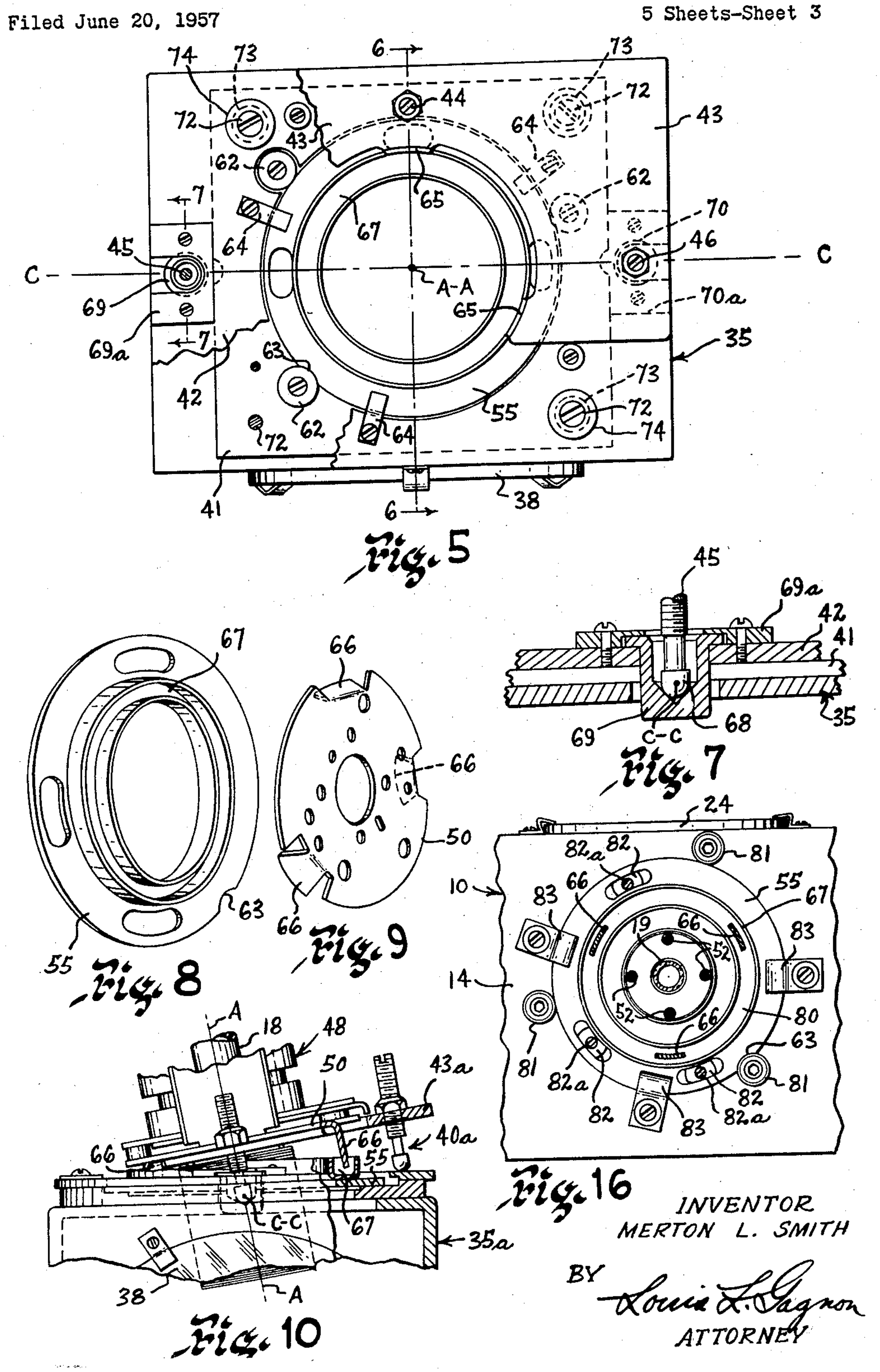
Fig. 5 is a top plan view of one of the picture tube aligning devices of the invention showing various parts thereof broken away for ease of illustration.
Fig. 7 is a fragmentary cross-sectional view taken on line 7—7 of Fig. 5.
Figs. 8 and 9 are perspective views of the picture tube mounting means of the invention.
Fig. 10 is a fragmentary side elevational view, partially in section, of another of the picture tube aligning devices of the invention.
Figure 13:
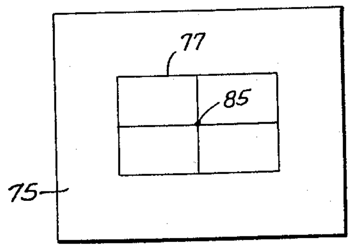
Figure 14:
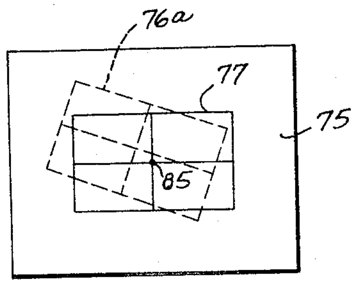
Figure 15:
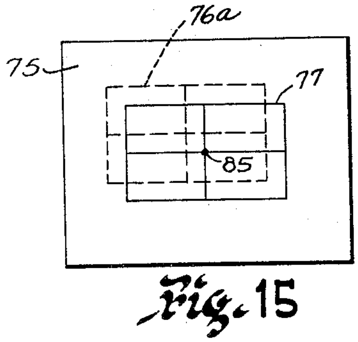

Figs. 13, 14 and 15 are elevational views of a target member used in conjunction with the aligning devices of Figs. 5 and 10 and diagrammatically illustrating various steps in the picture tube alignment procedure of the invention; and Fig. 16 is a cross-sectional view taken substantially on line 16—16 of Fig. 4 looking in the direction of the arrows.

Figure 1:
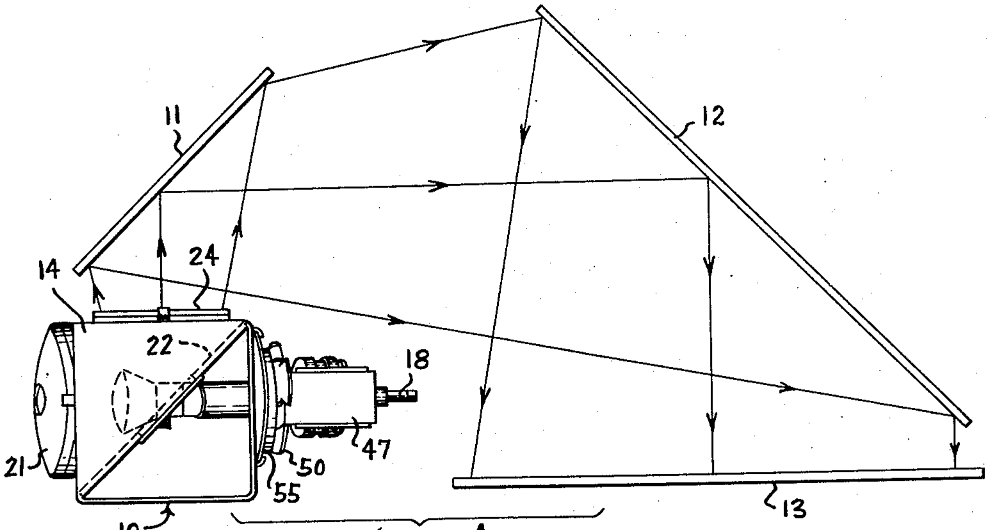
Fig. 1 is a diagrammatic top plan view of the projection apparatus of a television receiver of the type embodying the invention.

Referring more particularly to the drawings wherein like characters of reference designate like parts throughout the several views thereof, the device embodying the invention comprises a television receiver arrangement (Figs. 1 and 2) having a trinoscope assembly 10, a pair of plane surfaced mirror elements 11 and 12 and a rear projection type viewing screen 13. The assembly 10 comprises a box-like housing 14 having three integral partitioned chambers 15, 16 and 17, in side-by-side relation therein and a Schmidt-type optical projection unit in each of said chambers. Three projection type kinescopes, which are more commonly referred to as television picture tubes 18, 19 and 20 are mounted on one side of housing 14 so as to each have their luminous face portions extending inwardly of housing 14 and through one of the mirror elements of a respective Schmidt projection unit in chambers 15, 16 and 17. The Schmidt-type projection units each comprise a concave spherical mirror 21 having its center of curvature axially aligned with the center of curvature of its respective picture tube face and a plane surfaced mirror 22 having an aperture 23 for receiving the face portion of its respective picture tube. Mirror 22 is disposed at an angle of 45° relative to the general plane of mirror 21 to direct light rays reflected from mirror 21 outwardly of housing 14 through a corrector lens or plate 24 which is positioned at an angle of 45° relative to mirror 22. Corrector plate 25 is provided to eliminate the spherical aberration caused by the spherical mirror 21 by introducing additional spherical aberration which is equal and opposite that of mirror 21 and the center portion of mirror 21 is painted black or otherwise rendered non-reflective to prevent certain light rays emanating from its adjacent picture tube from being reflected back to the face of said tube and causing a washing out of the image contrast. While this reduces the all-over intensity of the projected image to a certain extent, it does not black out the center of the picture since light rays from all points on the face of the picture tube can reach the viewing screen by other paths.

The above described Schmidt-type projection systems are of a conventional type and function in conjunction with mirrors 11 and 12 to provide compact means for extending the throw or optical path from the faces of picture tubes 18, 19 and 20 to screen 13. In so doing the projected picture images of tubes 18, 19 and 20 are enlarged in accordance with the length of the throw or optical path. Since mirrors 21 function in the same manner as converging lenses, proper control of the spherical curvatures of mirrors 21 in accordance with the projection distances from the image sources (the faces of tubes 18, 19 and 20) to mirrors 21 and from mirrors 21 to screen 13 will produce an enlarged in-focus projected picture image at screen 13.

In order to superpose the picture images of each of the picture tubes 18, 19 and 20, the longitudinal axis of tube 19 is aligned relative to screen 13 so as to have the center point of its picture face located in a horizontal plane passing through a central point 26 on screen 13 (Fig. 20). Picture tubes 18 and 20 which are located at each side of tube 19, in the manner illustrated more particularly in Fig. 2, are tilted relative to tube 19 so as to cause a central point on the images formed on each of their tube faces to be aligned in superposed relation with point 26 when said images are projected to screen 13.

Figure 2:
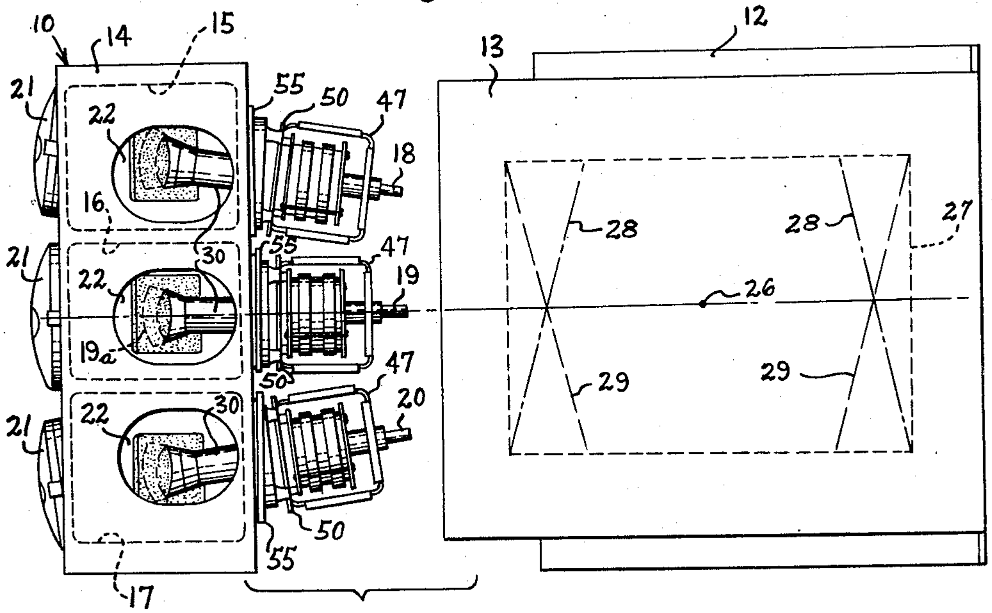
Fig. 2 is a diagrammatic front elevational view of the apparatus of Fig. 1.

An image formed on the luminous face of picture tube 19, when projected to screen 13, will be received substantially rectangular in shape as illustrated by the dotted outline 27, Fig. 2. However, images projected to screen 13 from picture tubes 18 and 20 would, if uncorrected, be distorted when received at screen 13 due to the angular disposition of the projection axes of tubes 18 and 20 relative to the plane of the screen 13. That is, a picture image from tube 18 would be keystoned generally as illustrated by dot-dash outline 28, Fig. 2, and a picture image from tube 19 would be keystoned generally in the manner illustrated by the dash-dash outline 29. In addition to the keystone distortion of the projected images from tubes 18 and 20, a pincushion distortion (a slight hollow effect or concave shape at the sides and upper and lower edges of the projected images) would be introduced into the projected picture images of all three picture tubes. This pincushion distortion is caused by the use of the spherical mirrors 21 in each of the Schmidt projection units and is well known and common to projection systems of the Schmidt-type.

In order to bring about a precise superpositioning of the projected picture images of all three tubes 18, 19 and 20 so as to cause all parts of said projected picture images to be in perfect registry with each other, it is necessary to introduce corrective keystone distortions into the picture images from tubes 18 and 20 which are equal and opposite to those illustrated by outlines 28 and 29 and to further compensate for the pincushion distortions caused by the Schmidt projection units by introducing barrel distortions into the images of tubes 18, 19 and 20 which are in amounts equal and opposite to said pincushion distortions. By barrel distortion it is meant the formation of an outward bowing or convex shape to the sides and upper and lower edges of the projected picture images.

The kinescopes or picture tubes 18, 19 and 20 are of the commonly known magnetic deflection type used for projection purposes and are each provided with a deflection yoke 30 located on their respective neck portions. Yokes 30 which control the electron scanning of the luminous tube faces, to produce the picture images or rasters on said tube faces, are specifically designed to introduce the above-mentioned corrective distortions into the picture images or rasters so as to cause the picture images to be formed on each of the tube faces of a particular shape which is such as to bring about substantially perfect registry of all parts of the superposed projected images thereof at screen 13 and to cause said composite images to be of a desired contour shape.

In television projection systems of the above character, the optical projection means including the Schmidt-type units, mirrors 11 and 12 and screen 13 may be quite readily standardized and controlled to provide predetermined optical paths for projecting images from picture tubes 18, 19 and 20 to screen 13. However, the positioning of the picture tubes relative to said optical projection means is extremely critical if perfect registry of the superposed images at screen 13 is to be obtained. For this reason an exact and rigid mounting of the picture tubes is essential.

Since the design of all electron tubes is extremely intricate, it is impossible to obtain an accurate control or standardization of the operating characteristics of television picture tubes. That is, slight variations in the axial alignment, and locations of the rasters or picture images on the tube faces of different tubes are unavoidable. In addition, the physical characteristics of different picture tubes are not constant. That is, the relationship between the faces of said tubes and their respective neck portions may vary. It can then be seen that even though said tubes might be electrically interchangeable, they would not be physically interchangeable or vice versa. In view of this fact, it is necessary to align each individual picture tube of a projection apparatus, such as described above, with the optical projection means of said apparatus in order to obtain a substantially perfect superpositioning and registry of the individual projected image components of the composite image at screen 13. Such alignment procedures have heretofore required intricate and complicated mounting means associated with the optical projection means of a television receiver and it has been required that the alignment procedure be carried out on the receiver itself. Replacement of picture tubes then become a tedious, time-consuming and expensive task as previously mentioned.

The principal features of the present invention relates to novel mounting means and method for overcoming the difficulties heretofore encountered in mounting and aligning the various picture tubes of projection type television receivers. In this respect, the picture tubes 18, 19 and 20 are separately pre-aligned, pre-focused and provided with reference mounting means prior to their assembly with the housing 14. Housing 14 is provided with individual matching reference mounting means for receiving the mounting means of the respective picture tubes whereby, when mounted on housing 14, tubes 18, 19 and 20 will automatically be accurately aligned with their respective Schmidt optical units to cause a precisely registered and enlarged composite image of their individual picture components to be received at screen 13.

Figure 6:
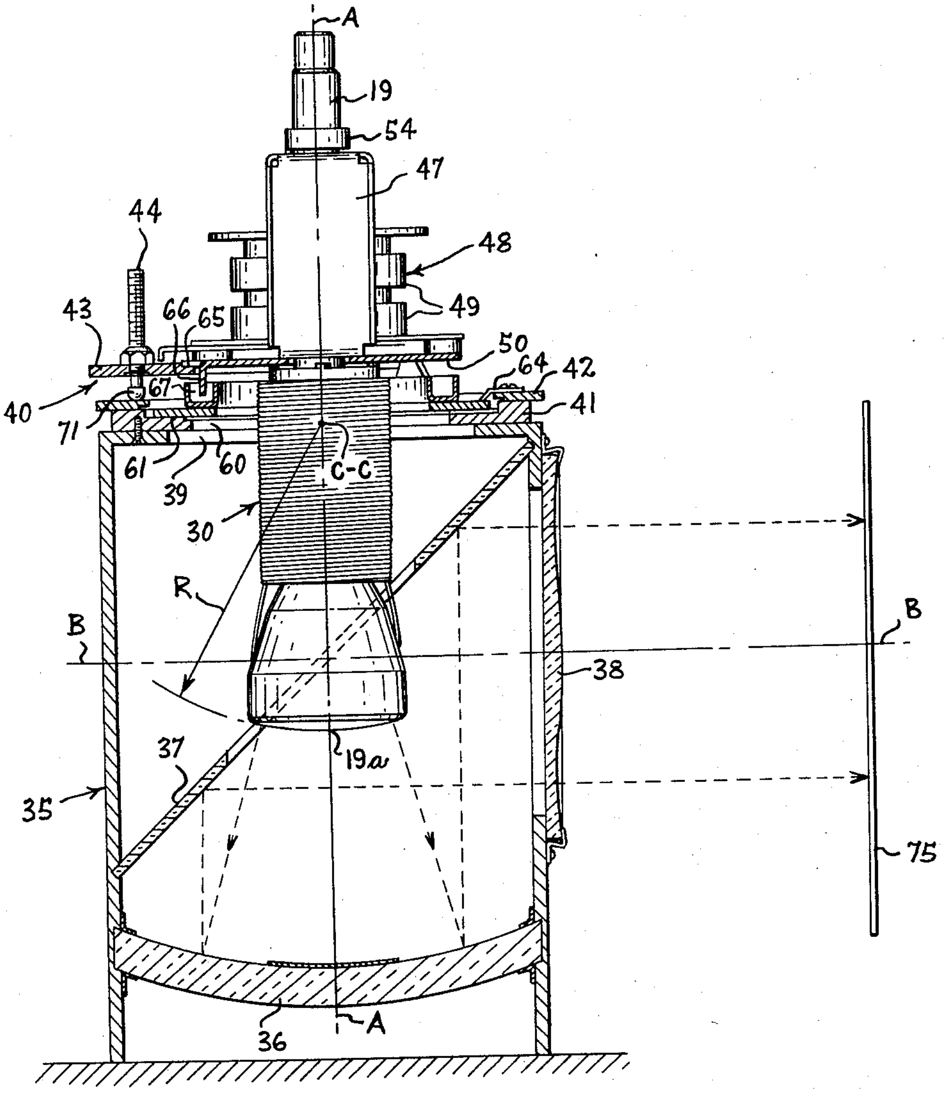
Fig. 6 is a longitudinal cross-sectional view of the device of Fig. 5 taken substantially along line 6—6 and having a picture tube positioned therein.

In order to prealign the individual picture tubes in accordance with the requirements of the particular Schmidt optical units with which the tubes are to be used, separate optical projection boxes of the type shown in Figs. 5, 6 and 10 are provided for each of the tubes 18, 19 and 20. The projection boxes are each provided with a Schmidt-type optical projection unit which is substantially identical in character to the projection units in the respective chambers 15, 16 and 17 of housing 14. That is, the projection box 35, Figs. 5 and 6, which is used to prefocus and prealign picture tube 19, is provided with a concave spherical mirror 36, a plane surfaced mirror 37 and a corrector plate 38 which are substantially identical to mirrors 21, 23 and corrector plate 24 in chamber 16 of housing 14. The top of box 35 is provided with an opening 39 and a picture tube supporting jig 40. Jig 40 is secured to the top of box 35 over opening 39 and embodies a base plate 41 rigidly secured to box 35, an intermediate plate 42 attached to and slidable on plate 41 and an upper adjustable plate 43 having three adjusting screws 44, 45 and 46 threadedly engaged therein. Plate 43 is adapted to support a picture tube to be prefocused and prealigned and adjustment of said tube relative to the optical elements 36, 37 and 38 is accomplished by manipulation of screws 44, 45 and 46.

In addition to the deflecting yokes 30, each of the picture tubes 18, 19 and 20 are provided with brackets 47 which are clamped to the tube necks. Brackets 47 are provided to simultaneously support the deflection yokes 30 and focusing magnets 48 in their proper positions of use on the necks of tubes 18, 19 and 20. The focusing magnets 48 are conventional ring-like permanent magnets 49 which function in a well known manner to focus the electron scanning beam of a picture tube at its luminous screen or face portion to produce an in focus picture image on the tube face when the tube is in operation.

Figure 11:
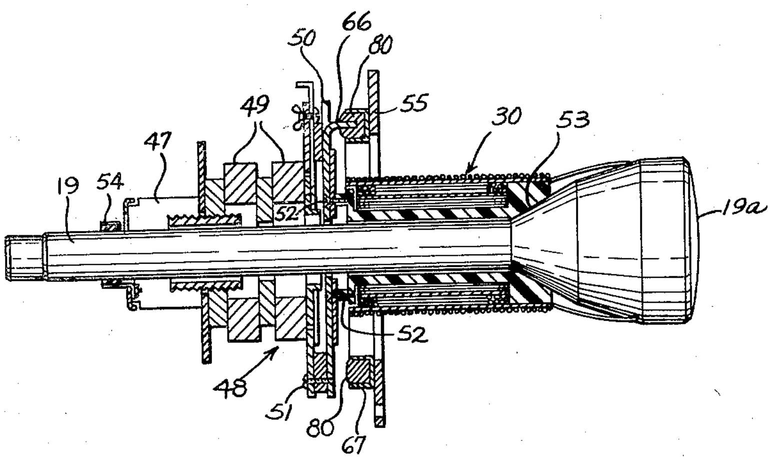
Fig. 11 is a cross-sectional view of a television picture tube with the mounting means of Figs. 8 and 9 shown in position of use thereon.

In order to provide the previously mentioned reference mounting means on each of the picture tubes, a mounting plate 50 is secured between bracket 47 and yoke 30 by screws 51 and 52 respectively, Fig. 11. The magnets 48, bracket 47, plate 50 and yoke 30 assembly are removably positioned on each of the picture tubes by sliding same along the necks of the tubes so as to cause a tapered end part 53 of the yokes 30 to engage the enlarged funnel-shaped end of said tubes in the manner shown more particularly in Figs. 4 and 11. A collar part 54 on bracket 47 is then clamped to the neck of the picture tube so as to prevent longitudinal displacement of the mentioned assembly thereon. In addition to plate 50, a second ring-like plate 55 is provided to mate with and be attached to plate 50 when the picture tube is accurately aligned relative to the optical projection elements in a particular box 35. Plate 55 then becomes the mounting means for attaching the picture tube unit to housing 14 of the trinoscope assembly 10.

The alignment of picture tube 19 will first be described since its alignment procedure is somewhat simpler than that of tubes 18 and 20 as will become apparent from the description to follow.

Referring more particularly to Figs. 6–9 of the drawings, the first step in aligning picture tube 19 is to select a ring-like reference plate 55 and place plate 50 on the base plate 41 of box 35. Base plate 41 is provided with a central opening 60 somewhat smaller in diameter than the outer diameter of plate 55 and is further provided with a recessed annular shouldered part 61 about opening 60 which forms a seat for receiving the ring-like plate 55 in the manner illustrated in Fig. 6. In order to axially align plate 55 with a central projection axis A—A of the optical system in box 35, a plurality of radially disposed locating studs 62 are provided on base plate 41 about the shouldered part 61 thereof so as to engage the peripheral edge portions of plate 55 in the manner illustrated in Fig. 5. One of the studs 62 is positioned so as to interfit with a semi-circular recess 63 in the edge of plate 55. Recess 63 keys the plate 55 to base plate 41 of the box 35 to prevent rotation thereof during the aligning procedure and is subsequently used as a reference for mounting the picture tube assembly on housing 14. Plate 55 is held in seated and aligned relation with base plate 41 by a plurality of clamps 64, Figs. 5 and 6. The previously described picture tube assembly embodying tube 19, yoke 30, mounting plate 50, bracket 47 and focusing magnets 48 is inserted into box 35 by passing the funnel-shaped end of said tube through the central opening in the ring-like plate 55, opening 60 in base plate 41 and opening 39 in the top of box 35. In so doing, the face portion 19*a* of tube 19 will extend through the apertured mirror 37 in the manner shown in Fig. 6 and the mounting plate 50 will rest on a plurality of recessed seats 65 (Figs. 5 and 6) provided on the upper adjustable plate 43 of jig 40. It will be noted from Figs. 6, 8 and 9 that mounting plate 50 is provided with a plurality of turned down lugs 66 which are adapted to extend into an annular U-shaped channel 67 on the upper side of plate 55. Channel 67 is of a width sufficient to permit a considerable lateral adjustment of the tube assembly to take place without causing the lugs 66 of plate 50 to strike the side walls of said channel.

Adjustment of the tube face 19*a* relative to the optical elements 36, 37 and 38 is then accomplished by manipulating the adjusting screws 44, 45 and 46 which support the adjustable upper plate 43 of jig 40. Screws 45 and 46 are threaded through the upper plate 43 and are provided with spherically shaped lower end parts 68, Fig. 7, which are each seated in a respective socket 69 and 70. Sockets 69 and 70 are each mounted on the intermediate plate 42 of jig 40 by clamps 69*a* and 70*a* respectively and are provided with a conically shaped internal bore for receiving the ends 68 of screws 45 and 46 in the manner shown more particularly in Fig. 7. Adjusting screw 44 is threaded through plate 43 of jig 40 and is provided with a spherically shaped lower end part 71, Fig. 6, which rests upon the upper surface of plate 42. Rotation of screw 44 will cause plate 43 to pivot about an axis C—C extending through the spherical end parts of screws 45 and 46, Figs. 5, 6 and 7. Sockets 69 and 70 extend below base plate 41 an amount sufficient to locate axis C—C at a radial distance R from the face 19*a* of tube 19 which radial distance is substantially equal to the radius of curvature of the tube face 19*a*.

The first step in the aligning procedure is to position the axis C—C in intersecting relation with the optical axis A—A of the optical projection system. This is accomplished by sliding the plate 42 of jig 40, which carries the sockets 69, relative to base plate 41. Plate 42 is provided with clamp screws 72 which extend through enlarged openings 73 therein and threadedly engage in base plate 41. An oversized washer 74 is placed between the heads of each of said screws 72 and the upper surface of plate 42 so as to overlie the enlarged openings 73 therein. By tightening screws 72 against washers 74, plate 42 may be rigidly clamped to plate 41 and by loosening screws 72, plate 42 is free to slide on plate 41 within the limits of the enlarged openings 73.

When the axis C—C which passes through sockets 69 and 70 has been aligned so as to intersect the optical axis A—A, screws 72 are tightened so as to clamp plate 42 securely to base plate 41 of jig 40. Normally, this adjustment is not repeated for the aligning of each subsequent picture tube since the reference plate 50 and yoke 30, and bracket 47 assembly is constructed so as to automatically align the center of plate 50 with the longitudinal axis of the picture tube and thus cause the longitudinal axis of the tube to be automatically aligned with axis A—A when reference plate 50 is located on the seats 65 of the upper adjustable plate 43 of jig 40.

Figure 12:
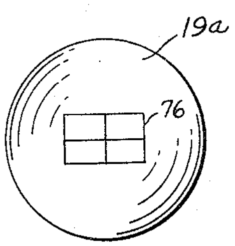
Fig. 12 is a view of the luminous face portion of a television picture tube diagrammatically illustrating the formation of a particular test pattern on said luminous face portion.

Picture tube 19 must next be focused relative to mirror 36. That is, an image formed on the face **19*a* of tube 19 must be located at a predetermined axial distance from mirror 36 so as to cause said image when projected by the optical system of box 35 to be received in focus at a screen 75 located at a controlled distance remote from box 35. Screen 75 is disposed in a plane normal to axis B—B of the optical system. Since mirror 36 optically functions in the same manner as a converging lens, the focal distances from the object (face 19*a* of tube 19) to the mirror 36 and from the mirror 36 to the image of the object (screen 75) must be precisely controlled in accordance with the curvature of mirror 36 to cause the image to be of a desired enlarged size and in focus at screen 75. Screen 75 is positioned at a predetermined optical distance from mirror 36 in accordance with the desired size to which the image from tube face 19*a* is to be enlarged and tube face 19*a* is adjusted along axis A—A to locate said tube face at its focal distance from mirror 36. Movement of tube 19 along axis A—A is accomplished by rotating screws 44, 45 and 46 (which all have the same pitch) equal amounts in the proper directions. In order to determine an in-focus condition of tube face 19*a* relative to mirror 36, tube 19 is energized and a suitable test pattern 76 is electronically applied to tube face 19 by well known and common methods. Test pattern 76** would preferably be of the shape illustrated in Fig. 12 but may be of any desired configuration which would accomplish the following results.

When the tube face **19*a* is adjusted along axis A—A to the point where the image of pattern 76 is focused at screen 75, the center of curvature of tube face 19*a* will be substantially coincident with or will lie on axis C—C as shown in Fig. 6 since the assembly including reference plate 50 is prelocated on the neck of tube 19 so as to cause plate 50 to be at a predetermined distance from tube face 19*a* and from its center of curvature in accordance with the required focal distance from mirror 36 to tube face 19*a***.

The next step in the aligning procedure is to align the vertical and horizontal axes of the test pattern 76 by rotating the picture tube assembly including reference plate 50 on the seats 65 of jig 40. Screen 75, Fig. 13, is provided with a target 77 identical in shape to the test pattern 76 but enlarged to be equal in size to the projected image of pattern 76. Fig. 14 illustrates the target 77 in full lines and the projected image **76*a* of pattern 76 in dotted lines as it might be received in off axis relation with target 77. Rotation of the above mentioned picture tube assembly in the proper direction will then cause the vertical and horizontal axes of the test pattern image 76*a* to be aligned parallel with the vertical and horizontal axes of target 77 as illustrated in Fig. 15. At this point, however, the test pattern image might not be in superposed relation with target 77 and an additional step of superposing the image 76*a* and pattern 77** would be necessary. It is pointed out that the following step and the preceding step may be performed simultaneously but for purposes of clarity, will be described separately.

To superpose image **76*a* with target 77, the tube assembly is tilted about axis C—C by raising or lowering screw 44 (Fig. 6) in plate 43 of jig 40. This moves tube face 19*a* sidewise without disturbing the focus of image 76*a* at screen 75 since in moving sidewise, the tube 19 is automatically pivoted about axis C—C which is aligned with the center of curvature of its face 19*a*. If a lateral adjustment of the tube face in a meridian normal to axis C—C is required to superposed image 76*a* with target 77, screws 45 and 46 are rotated to raise or lower their adjacent sides of plate 43. That is, if screw 45 is rotated to raise plate 43, screw 46 must be rotated in an opposite direction, an amount equal to that of screw 45. Likewise, if screw 45 is operated to lower plate 43, screw 46 must be operated equally and oppositely to raise its adjacent side of plate 43. This manipulation of screws 45 and 46 causes a tilting of tube 19 about its center of curvature of face 19*a* and does not disturb the focus of image 76*a* but causes a lateral shifting of the face 19*a* relative to mirror 36**.

When picture tube 19 has been focused and aligned as described above so as to cause image **76*a* to be in focus and in perfect registry with target 77, a metallic alloy 80, preferably of the low temperature melting type is poured into channel 67 of the ring-like reference plate 55. The metal alloy 80 surrounds the depending lugs 66 of plate 50 and when cooled causes plate 55 to be rigidly and securely attached to plate 50 and the tube 19 assembly. The complete pre-focused and pre-aligned picture tube unit and its reference mounting ring 55 is removed from box 35 and positioned in housing 14 of the trinoscope 10**.

Housing 14 is provided with a plurality of lugs 81 for receiving the reference plate 55 in precisely the same manner as lugs 62 of box 35. That is, one of the lugs 81 is adapted to interfit with recess 63 in place 55 to orient said plate and tube assembly so as to establish an orientation of its picture image when projected to screen 13 of the receiver and thus cause its horizontal and vertical meridians to be properly aligned. A plurality of adjustable stops 82, preferably three in number, are also provided on housing 14 to function as seats against which plate 55 rests and plate 55 is rigidly secured to housing 14 by clamps 83. However, the picture tube 19 assembly must be adjusted relative to the optical projection means in housing 14 so as to cause its projected picture image to be in focus at the viewing screen 13 of the receiver. This is accomplished by operating screws **82*a* of stops 82 so as to move stops 82 in or out as required. A target identical to target 77 is provided on screen 13 and by the above mentioned adjustment of stops 82, perfect focus and registry of test pattern 76*a* may be accomplished at viewing screen 13**.

It is particularly pointed out that hereafter no further adjustment of the stops 82 of housing 14 is performed since once adjusted, the tube assembly 19 may be removed by releasing clamps 83 and replaced by other pre-focused and pre-aligned tubes which have been prepared in box 35 as described above.

The pre-aligning of the trinoscope would normally be done at the factory and when marketed would need no further aligning for servicing purposes since replacement of picture tubes 19 by the above mentioned pre-focused and pre-aligned tube 19 units would simply require that the old tube unit be removed by releasing clamps 83 and a new one placed against stops 82 with its notch 63 interfitted with one of the studs 81.

The pre-focusing and pre-aligning of picture tubes 18 and 20 would be accomplished in substantially the same manner as described above for picture tube 19. However, since tubes 18 and 20 are tilted relative to tube 19 to cause a superpositioning of their projected picture images with the picture image of tube 19 in the manner disclosed above, separate optical projection boxes 35a must be provided for the pre-focusing and pre-aligning of each of the tubes 18 and 20.

Figure 3:
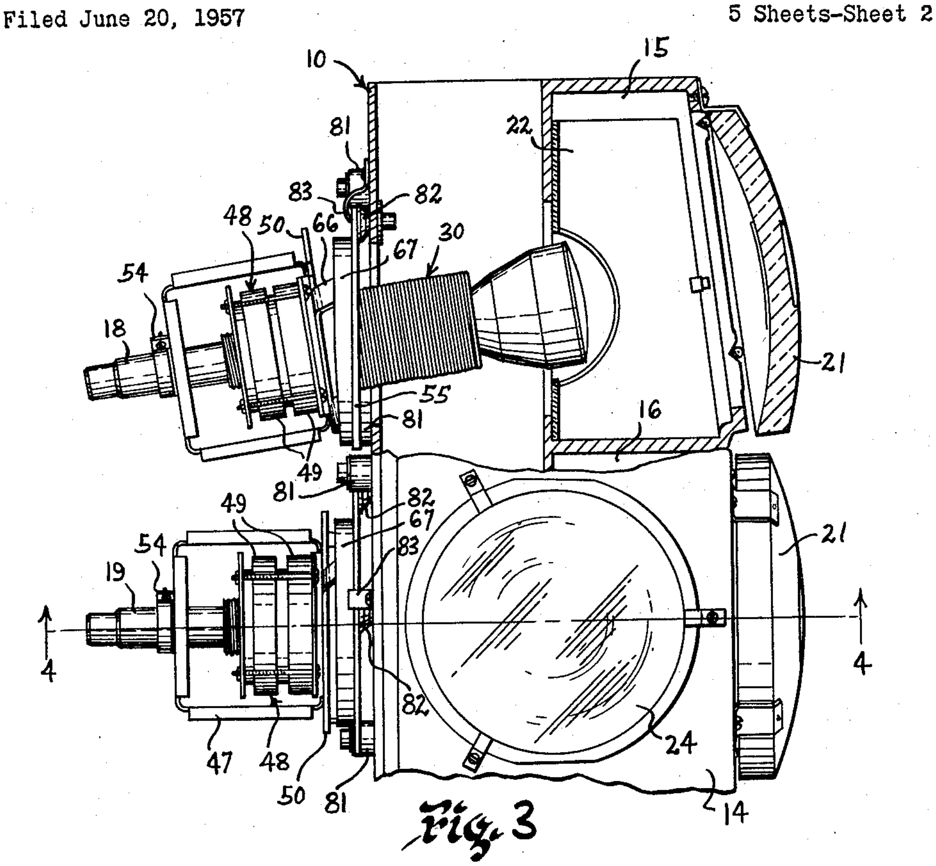
Fig. 3 is a fragmentary side elevational view, partially in section, of the picture tube supporting part of the apparatus of the invention.

A portion of one of the projection boxes 35a is illustrated in Figure 10 wherein box 35a is arranged to align picture tube 18. The aligning jig 40a is substantially the same as jig 40 of box 35 with the exception that its upper adjustable plate 43a is tilted to position tube 18 at an angle relative to the optical projection elements in box 35a which is equal to the angle of tilt required of tube 18 when positioned on housing 14 of the receiver, Fig. 3. The optical projection system in box 35a is aligned relative to the projection axis A—A of tube 18 in precisely the same manner as the optical projection system in chamber 15 of housing 14. The screen 75 having target 77 thereon is located at a position remote from box 35a equal to the focal distance of the spherical mirror with its center point 85 of target 77 aligned with the outwardly directed projection axis of box 35a. The alignment of tube 18 is accomplished in exactly the same manner as the alignment of tube 19. That is, jig 40a is operated exactly as jig 40 to first locate the longitudinal axis A—A of tube 18 on axis C—C. The focusing of tube 18 is accomplished by raising and lowering plate 43a and the centering and aligning of the horizontal and vertical meridians of the picture image with target 77 is accomplished by pivoting tube 18 about axis C—C and simultaneously or separately rotating said tube about its projection axis A—A.

It will be noted that due to the angle of tilt of tube 18, Fig. 10, it is necessary to provide longer lugs 66 on one side of reference plate 50 and shorter lugs 66 on the opposite side thereof in order to cause all the lugs 66 to be disposed within the channel 67 of plate 55.

When the alignment of tube 18 is completed, a low melting metal alloy is poured into channel 67 to secure the reference mounting plate 55 to the picture tube assembly in the manner described above for picture tube 19. Tube 18 is then ready for assembly with housing 14 of trinoscope 10. The pre-focused and pre-aligned picture tube 18 is assembled with housing 14 by following exactly the procedure outlined for tube 19 and once tube 18 is aligned with housing 14, removal and replacement of said tube by other similarly pre-aligned and pre-focused tubes may be accomplished without any further need of alignment at the television receiver.

Picture tube 20 is aligned in exactly the same manner as tube 18 with the exception that the angle of tilt of tube 20 is opposite to that tube 18. This of course requires a third optical projection box similar to box 35a but having its projection axis A—A sloping downwardly from left to right instead of from right to left as illustrated in Fig. 10.

It is to be understood that the above discussed alignment procedure at the housing 14 of the television receiver is only performed at the time the three picture tubes 18, 19 and 20 are first mounted thereon and no further adjustment of the receiver is required to subsequently replace the picture tubes with other pre-focused and pre-aligned picture tubes which are prepared as disclosed above. The initial alignment of the picture tubes on housing 14 is to compensate for any slight variations which might exist between the optical characteristics of the optical projection elements in the receiver and the optical projection elements in the projection boxes used to align tubes 18, 19 and 20. In a production set up it would be preferable to use one set of pre-focused and pre-aligned picture tubes 18, 19 and 20 as masters with which the aligning and setting of the stops 82 on each of the receivers would be performed at the factory. If, however, it was necessary to provide more than one set of the required three optical aligning boxes in order to meet the demand for pre-focused and pre-aligned picture tube units, the additional sets would have to be painstakingly made to precisely match and be identical in character to the original three aligning boxes upon which the master tubes were aligned so as to provide pre-focused and pre-aligned picture tube units which would be interchangeable and readily adaptable to the receivers which were aligned in accordance with the master tube units.

From the foregoing, it can be seen that simple, efficient and economical means and method have been provided for accomplishing all the objects and advantages of the invention. However, it is to be understood that various omissions, substitutions and changes in the forms and details of the embodiments illustrated may be made by those skilled in the art without departing from the spirit of the invention.

Having described my invention, I claim:

1. In a device of the character described for use with a housing having optical projection means therein with the projection axes of said projection means being prelocated in fixed predetermined relation with each other and having receiving means embodying engagement means and locating means in predetermined fixed relation with respect to each of said optical axes of said optical projection means, said device comprising a plurality of kinescopes each having a mounting plate thereon provided with a side surface for engaging the engagement means of a respective receiving means of the housing and peripheral edge portions for engaging the locating means of said receiving means, each of said kinescopes being initially supported with its image-producing means focused along a given axis and having its respective mounting plate pre-located and supported with its side surface which is to engage said engagement means being located at a given fixed distance from the face of said focused kinescope and in a controlled fixed angular relation with respect to the given axis of said focused kinescope and having its peripheral edge portions which are to engage with the locating means on the housing being pre-positioned at a fixed distance from said given axis, one of said locating means of said receiving means and one of said peripheral edge portions of said mounting plate being in the form of a notch and the other in the form of a projection fitting in said notch to fix the orientation of the kinescope in said receiving means, and means for permanently securing said mounting plate to said kinescope in said pre-located position, whereby the focused kinescope, when its mounting plate is assembled with its respective receiving means on the housing, will automatically properly orient said kinescope and locate its given axis in aligned relation with the optical axis of the respective associated optical projection means in the housing.

2. In a device of the character described for use with a housing having optical projection means therein with the projection axis of said projection means being prelocated in fixed predetermined relation with receiving means on said housing embodying engagement means and locating means in predetermined fixed relation with each other, said device comprising a kinescope having a mounting plate thereon provided with a side surface for engaging the engagement means of the receiving means of the housing and with peripheral edge portions for engaging the locating means of said receiving means, said kinescope being initially supported with its image-producing means focused along a given axis and having its respective mounting plate pre-located and supported with its side surface which is to engage said engagement means being located a given fixed distance from the face of said focused kinescope and in a controlled fixed angular relation with respect to the axis of said focused kinescope and having its peripheral edge portions which are to engage with the locating means on the housing being prepositioned at a fixed distance from said axis, one of said locating means of said receiving means and one of said peripheral edge portions of said mounting plate being in the form of a notch and the other in the form of a projection fitting in said notch to fix the orientation of the kinescope in said receiving means, and means for permanently securing said mounting plate to said kinescope in said pre-located position, whereby the focused kinescope, when its mounting plate is assembled with its receiving means on the housing, will automatically properly orient said kinescope and locate its axis in aligned relation with the optical axis of the associated optical projection means in the housing.

3. In a device of the character described for use with a housing having optical projection means therein with the projection axis of said projection means being prelocated in fixed predetermined relation with receiving means embodying engagement means and locating means in predetermined fixed relation with each other, said device comprising a kinescope having a neck portion, a plate attached to said neck portion, a second mounting plate having a central opening therein in surrounding relation with said neck portion, one of said plates having a circumferential channel therein and the other projection means extending within said channel, said second mounting plate being provided with a side surface for engaging the engagement means of the receiving means of the housing and peripheral edge portions for engaging the locating means of said receiving means, said kinescope being initially supported with its image-producing means focused along a given axis and said second mounting plate being pre-located and supported with its side surface which is to engage said engagement means being located a given fixed distance from the face of said focused kinescope and in a controlled fixed angular relation with respect to the axis of said focused kinescope and having its peripheral edge portions which are to engage with the locating means on the housing being pre-positioned at a fixed distance from said axis, one of said locating means of said receiving means and one of said peripheral edge portions of said second mounting plate being in the form of a notch and the other in the form of a projection fitting in said notch to fix the orientation of the kinescope in said receiving means, and solder means positioned in said channel for permanently securing said first plate to said second mounting plate in said prelocated position, whereby the focused kinescope, when said second mounting plate is assembled with the receiving means on the housing, will automatically properly orient said kinescope and locate its axis in aligned relation with the optical axis of the associated optical projection means in the housing.

4. A kinescope mount for use with an optical image projection system comprising a circular plate on said kinescope positioned at a predetermined spaced distance from the image forming face portion of said kinescope with a central axis through said plate intersecting the geometrical center of an image when formed on said face of said kinescope, the plane of said plate being angled relative to the axis of said kinescope in such manner as to cause said central axis through said plate to be perpendicularly disposed relative to the general plane of said image, a notch in the peripheral edge of said plate, said plate being rotationally oriented about said kinescope to locate said notch in predetermined angular relation to said image, means for securing said plate to said kinescope in said aligned relation therewith, a housing having said optical image projection system therein, receiving means on said housing aligned with the optical axis of said projection system and embodying engagement and locating means in predetermined fixed relation with said optical axis of said projection system, the mounting plate of said kinescope being mated with said receiving means with its side surface which is directed toward said face of said kinescope engaging said engagement means and its peripheral edge portion engaging the locating means of said receiving means, said notch being interfitted with one of said locating means, and clamping means for clamping said plate to said receiving means whereby the kinescope when assembled with said receiving means on the housing will automatically be aligned with the projection axis of said projection system to cause the image formed on the image forming face to be accurately projected along said optical axis of said projection system.

5. A kinescope mount for use with an optical image projection system comprising a first plate encircling the body portion of a kinescope and rigidly secured thereto, a plurality of flanged parts on the periphery of said first plate directed toward the image forming face part of said kinescope, a second plate encircling said kinescope between said face part and said first plate, said second plate being positioned at a predetermined spaced distance from said image forming face part of said kinescope with a central axis through said second plate intersecting the geometrical center of an image when formed on said face of said kinescope, the plane of said second plate being angled relative to the geometrical axis of said kinescope in such manner as to cause said central axis through said second plate to be perpendicularly disposed relative to the general plane of said image, a notch in the peripheral edge of said second plate, said plate being rotationally oriented about said kinescope to locate said notch in predetermined angular relation to said image, an annular channel on said second plate opening towards said first plate for receiving the flanged parts thereof, solder means rigidly connecting said flanged parts to said channel to permanently fix said second plate in said aligned relation with said image forming face of said kinescope, a housing having said optical image projection system therein, receiving means on said housing aligned with the optical axis of said projection system and embodying engagement and locating means in predetermined fixed relation with said optical axis of said projection system, said second plate on said kinescope being mated with said receiving means with its side surface which is directed toward said face of said kinescope engaging said engagement means and its peripheral edge portion engaging the locating means of said receiving means, said notch being interfitted with one of said locating means and clamping means for clamping said second plate to said receiving means whereby the kinescope when assembled with said receiving means will automatically be aligned with the projection axis of said projection system to cause the image formed on the image forming face of said kinescope to be accurately projected along said optical axis of said projection system.

6. A device of the character described comprising a kinescope having a face part upon which a luminous image of controlled size and shape may be produced and an elongated neck portion having a bracket securely clamped thereon to which reference mounting means is attached in prealigned relation with said luminous image when said image is produced on said face part, said reference mounting means embodying a first apertured plate encircling said neck portion of said kinescope and rigidly secured to said bracket, a second apertured plate also encircling said kinescope at a location between said face part thereof and said first plate, said second plate being placed at a precontrolled distance from said face part of said kinescope with its general plane so disposed relative to said face part as to cause a preselected axis normal to and passing through said plate to intersect the geometrical center of said luminous image whereby a side of said second plate will provide reference means which may be used to automatically locate said center of said luminous image at a precontrolled distance from certain elements of optical projection means along the optical axis thereof when said kinescope is in a position of use therewith, said second plate being of precontrolled outer contour size and shape so as to cause opposite sides of its edge portion to be at precontrolled radial distances from said axis through said plate, whereby said edge portions will provide means by which said luminous image may be automatically aligned in lateral directions relative to said optical axis of said optical projection means, locating means adjacent an edge portion of said second plate positioned in a predetermined angularly oriented relation with said luminous image to provide means by which said kinescope may be rotatably aligned to position said luminous image in a desired oriented relation with said projection means and means rigidly securing said second plate to said first plate in said above prealigned relation with said luminous image.

References Cited in the file of this patent

UNITED STATES PATENTS

| | | |
|---|---|---|
| 2,424,513 | Stephan | July 22, 1947 |
| 2,467,185 | Cady | Apr. 12, 1949 |
| 2,549,585 | Epstein | Apr. 17, 1951 |
| 2,549,978 | Kuperous | Apr. 24, 1951 |
| 2,571,233 | Groenenberg | Oct. 16, 1951 |
| 2,585,746 | Davis | Feb. 12, 1952 |